United States Patent
Jaradi et al.

(10) Patent No.: US 10,214,104 B1
(45) Date of Patent: Feb. 26, 2019

(54) ACCELERATOR PEDAL FOR VEHICLE INCORPORATING LIQUID NANOFOAM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/823,990

(22) Filed: Nov. 28, 2017

(51) Int. Cl.
| | |
|---|---|
| *G05G 5/03* | (2008.04) |
| *B60K 26/02* | (2006.01) |
| *F16H 19/02* | (2006.01) |
| *G05G 1/30* | (2008.04) |
| *F16H 19/04* | (2006.01) |

(52) U.S. Cl.
CPC .......... *B60K 26/021* (2013.01); *F16H 19/04* (2013.01); *G05G 1/30* (2013.01); *G05G 5/03* (2013.01)

(58) Field of Classification Search
CPC .................. B60K 26/02; B60K 26/021; B60K 2026/026; F16H 19/04; B60T 7/04; G05G 1/30; G05G 1/44; G05G 1/445; G05G 1/46; G05G 5/03; G05G 5/04; G05G 5/05
See application file for complete search history.

(56) References Cited

U.S. PATENT DOCUMENTS

| 2,196,126 | A | * | 4/1940 | Smith | ...................... | B60T 7/04 |
| | | | | | | 188/167 |
| 3,023,634 | A | * | 3/1962 | Tozza | ..................... | B60K 26/02 |
| | | | | | | 74/501.6 |
| 3,430,512 | A | * | 3/1969 | Wossner | ............... | F16D 25/088 |
| | | | | | | 74/512 |

(Continued)

FOREIGN PATENT DOCUMENTS

| DE | 102011084651 A1 * | 6/2012 | ........... B60K 26/021 |
| JP | 2014069698 A | 4/2014 | |

OTHER PUBLICATIONS

Mingzhe Li and Weiyi Lu, Liquid marble: A novel liquid nanofoam structure for energy absorption, AIP Advances, vol. 7, Issue 5, 055312 (2017): https://doi.org//10.1063/1.4984231, Published May 2017.

*Primary Examiner* — Adam D Rogers
(74) *Attorney, Agent, or Firm* — LeClairRyan

(57) ABSTRACT

An accelerator pedal assembly including an accelerator pedal attached to the driver's compartment of a vehicle is disclosed. The accelerator is reversibly movable between the neutral or idling position when no pressure is applied to the pedal and an acceleration position when pressure is applied. The assembly includes a compression assembly having a compression chamber with a piston, liquid nanofoam in the chamber, and a geared driver assembly connecting the compression assembly and the pedal. When the pedal is depressed, the driver assembly is activated, forcing the piston into the chamber and causing the force level to rise until it reaches the designed load limit or the threshold. When the pressure on the pedal is relieved, the position of the pedal is immediately reset to the neutral position as the piston is pushed out of the chamber by internal pressure generated by liquid escaping the nanoporous material via the nanopores.

17 Claims, 8 Drawing Sheets

(56) References Cited

U.S. PATENT DOCUMENTS

| | | | | |
|---|---|---|---|---|
| 4,969,437 A * | 11/1990 | Kolb | ................... | B60K 26/04 |
| | | | | 123/399 |
| 5,012,689 A * | 5/1991 | Smith | ................... | B60W 30/18 |
| | | | | 200/317 |
| 5,865,510 A * | 2/1999 | Poertzgen | ............... | B60T 7/042 |
| | | | | 303/113.4 |
| 6,279,952 B1 * | 8/2001 | Van Wynsberghe | ... | B62D 1/192 |
| | | | | 280/777 |
| 6,343,522 B1 * | 2/2002 | Hori | ................... | B60R 22/4633 |
| | | | | 242/374 |
| 6,679,135 B1 * | 1/2004 | Faigle | ................... | G05G 1/30 |
| | | | | 74/512 |
| 7,082,853 B2 * | 8/2006 | Fujiwara | ................ | B60T 7/042 |
| | | | | 74/512 |
| 7,770,491 B2 * | 8/2010 | Ritter | ................... | B60K 26/021 |
| | | | | 74/560 |
| 8,823,243 B2 * | 9/2014 | Qiao | ................... | H02N 11/006 |
| | | | | 310/300 |
| 8,914,210 B2 * | 12/2014 | Schmitt | ............... | B60K 26/021 |
| | | | | 701/51 |
| 9,561,786 B2 * | 2/2017 | Shand | ................... | B60T 8/3255 |
| 2007/0034038 A1 | 2/2007 | Horie et al. | | |
| 2010/0225199 A1 | 9/2010 | Qiao et al. | | |

\* cited by examiner

US 10,214,104 B1

ACCELERATOR PEDAL FOR VEHICLE INCORPORATING LIQUID NANOFOAM

TECHNICAL FIELD

The disclosed inventive concept relates generally to accelerator pedals for vehicles. More particularly, the disclosed inventive concept relates to an accelerator pedal assembly for a vehicle that incorporates a rack and gear mechanism having a liquid nanofoam compression device. The accelerator pedal assembly provides an optimum gas pedal feel for acceleration of the vehicle without loss over time experienced by conventional spring-loaded accelerator pedals due to excessive use.

BACKGROUND OF THE INVENTION

Vehicle accelerators have traditionally been mechanical linkages or cables that transfer the position of the accelerator to engine throttle control. In the earliest days of motoring, engine accelerators appeared first as a hand-controlled accelerator arm positioned on the steering column beneath the steering wheel. This arrangement suited early vehicles as foot pedals and generally slower speeds made a floor-mounted foot pedal unnecessary and perhaps even inconvenient. As vehicles moved toward convention multi-speed manual transmissions, floor mounted foot pedals became the norm and have generally stayed there ever since.

The earliest floor-mounted foot pedal was a formed, spring-loaded bar that extended through the vehicle's floorboard. One end of the bar included a simple pedal and the other end of the bar was attached to the carburetor by way of two or more pivotable rods. Over time, the accelerator pedal assembly became more sophisticated, with some pedals being pivotably attached to the floor or suspended from behind the instrument panel.

A conventional known accelerator pedal is illustrated in FIGS. 1 and 2 as accelerator pedal assembly 10. The accelerator pedal assembly 10 includes an accelerator pedal 12 that is attached to a vehicle floor 14 by a pivot assembly 16 at one end. The other end of the pedal 12 includes an acceleration linkage assembly 18 that is connected to a throttle body by, for example, a cable. Depending on the preferred design, either the pivot assembly 16 or the acceleration linkage assembly 18 includes a spring which returns the accelerator pedal 12 to the neutral position, i.e., the vehicle idling position.

The stiffness of the spring in conventional accelerator pedals determines the so called "pedal feel." Some gas pedals feel too stiff to the driver and require too much force to depress the pedal to accelerate the vehicle. Other accelerator pedals can be too light to the driver's touch, are overly-responsive, and accelerate too quickly with only even the slightest pressure. Thus the tuning of the conventional accelerator pedal spring can be problematic or perhaps impossible, even when the assembly is new. If not done right, customers can be dissatisfied. When the vehicle has been used, the situation becomes more complex as spring wear may impact the "pedal feel" in a much less predictable manner.

As in so many areas of vehicle technology there is always room for improvement related to the design of accelerator pedals for vehicles. A new approach that provides optimum and tunable gas pedal feel for vehicle acceleration that does not change characteristics over time due to wear is needed to address the problems associated with known accelerator pedal arrangements.

SUMMARY OF THE INVENTION

The disclosed inventive concept overcomes many of the challenges faced by conventional accelerator pedal designs. The disclosed inventive concept eliminates the spring conventionally used in today's accelerator pedal designs and relies instead on liquid nanofoam to return the pedal to its neutral, non-accelerating or idling position. According to the disclosed inventive concept, the tuning of the force-displacement (stroke) curve is much simpler. The disclosed inventive concept provides vehicle designers with greater flexibility in the fixing of a preferred pedal force, thereby increasing the tunability of the accelerator design.

The disclosed inventive concept provides an accelerator pedal assembly including an accelerator pedal that is movably attached to the driver's compartment of a vehicle. The accelerator is reversibly movable between the neutral or idling position when no pressure is applied to the pedal and an acceleration position when pressure is applied to the pedal.

The assembly further includes a compression assembly having a compression chamber, a piston at least partially fitted within the chamber, a liquid nanofoam within chamber, and a geared driver assembly connecting the compression assembly with the accelerator pedal. The liquid nanofoam comprises a liquid having a suspension of nanoporous material.

The geared driver comprises a rack extending from the piston and a pinion gear engaged with the rack. The accelerator pedal is attached to a pedal accelerator arm. The arm has a long axis and has a rotary shaft extending therefrom. The shaft is generally perpendicular to the pedal accelerator arm. The pinion gear is attached to the rotary shaft. A fluid seal, such as an O-ring or a piston ring, provides a seal between the piston and the chamber.

The designation "nanomaterial" is applied to materials having internal structures the can be classified in the nanoscale or between about 1.0 nanometer and about 100.0 nanometer. Liquid nanofoam is formed by adding a predetermined volume of a hydrophobic nanoporous material to a selected liquid. The nanoporous material contains a large volume fraction of nanometer scale pores or nanopores. The surface of the nanoporous material is treated so that it is non-wettable to the liquid phase under ambient pressure. Accordingly, the nanopores of the nanoporous material remain void at ambient pressure due to the excessive solid-liquid interfacial tension.

When sufficiently high external pressure is applied to the nanofoam, the surface energy barrier is overcome and the liquid molecules are squeezed into the nanopores. As a result, the volume of the liquid nanofoam is reduced by as much as 80%. The volume fraction of the nanoporous material and the nanopore sizes determine the threshold pressure, which can vary from about 0.5 Mpa to about 50.0 Mpa, and the total volume change.

When the accelerator pedal is depressed, it rotates the rotary shaft and thus activates the rack and gear assembly. The rack and gear assembly in turn forces the piston to move into the liquid nanofoam chamber causing the force level to rise until it reaches the designed load limit or the threshold. The piston can generally stroke with approximately constant force until the predetermined compression limit of the liquid nanofoam is reached. When the pressure on the accelerator pedal is relieved, the position of the accelerator pedal is immediately reset to the neutral or idling position as the piston is pushed out of the chamber by internal pressure generated by liquid escaping the nanoporous material via the nanopores. The disclosed inventive concept is also advantageous over known accelerator pedal designs in that there is no damage or plastic distortion possible even after repeated and excessive use.

The length and width of the liquid nanofoam chamber, the properties of the liquid nanofoam, the dimensions of the rotary shaft, the rack and the gear can be optimized by selective tuning to achieve the optimum feel for the accelerator to suit a particular driver. The accelerator pedal assembly of the disclosed inventive concept is lightweight and can be efficiently packaged to readily fit a specific interior space.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
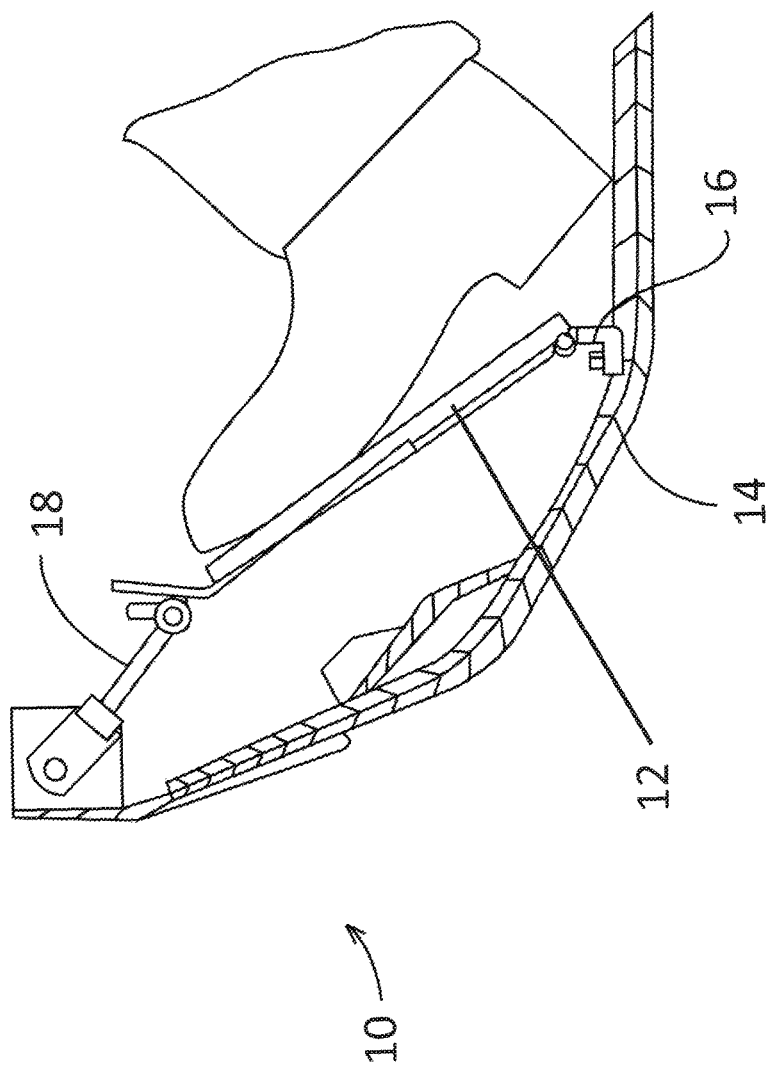
FIG. 1 is a side, diagrammatic view of an accelerator pedal assembly according to a known design.
Figure 2:
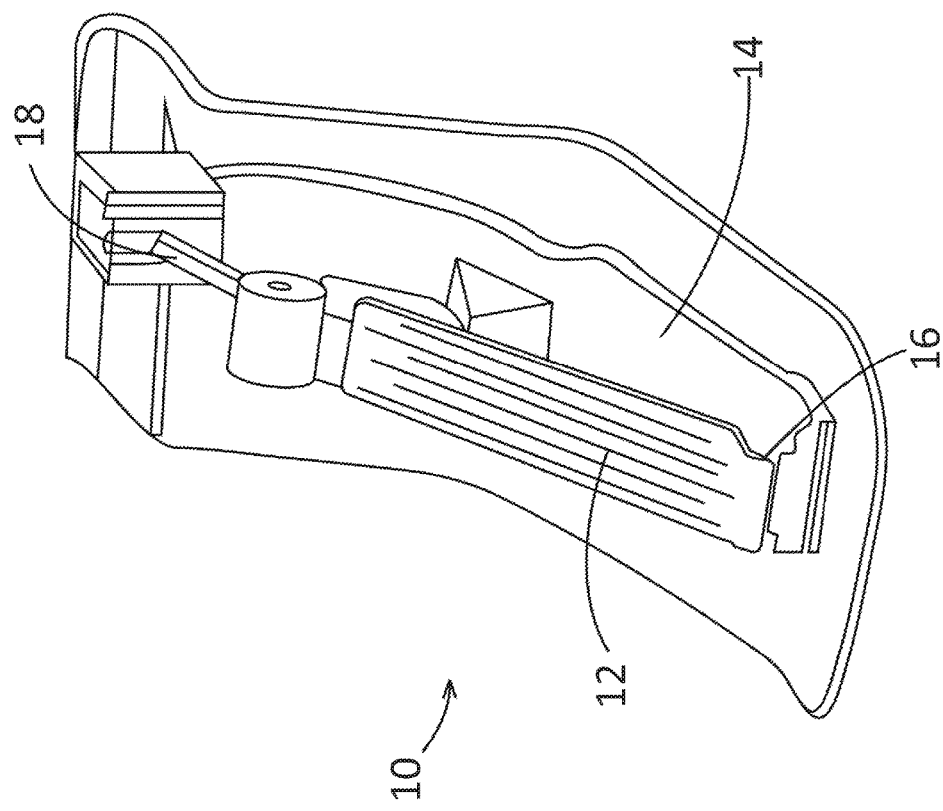
FIG. 2 is a perspective view of the accelerator pedal assembly of FIG. 1 according to a known design.

In the following figures, the same reference numerals will be used to refer to the same components. In the following description, various operating parameters and components are described for different constructed embodiments. These specific parameters and components are included as examples and are not meant to be limiting.

The accompanying figures illustrate an arrangement for providing an accelerator assembly for use with a vehicle in which the accelerator assembly includes a piston and cylinder assembly attached to an accelerator pedal. The piston and cylinder assembly includes a liquid nanofoam that is capable of returning the pedal to the neutral position following acceleration with virtually no delay in the return rate.

The accelerator assembly disclosed herein may be readily adapted for any vehicle that requires a foot pedal for use as an accelerator. The accelerator assembly is relatively inexpensive to produce and has a high rate of durability with virtually no sign of wear even after repeated and intensive operator use. It is to be understood that the illustrated accelerator assembly is not to be restricted to the configuration shown in the figures which is intended as being illustrative without being limiting.

Figure 3:
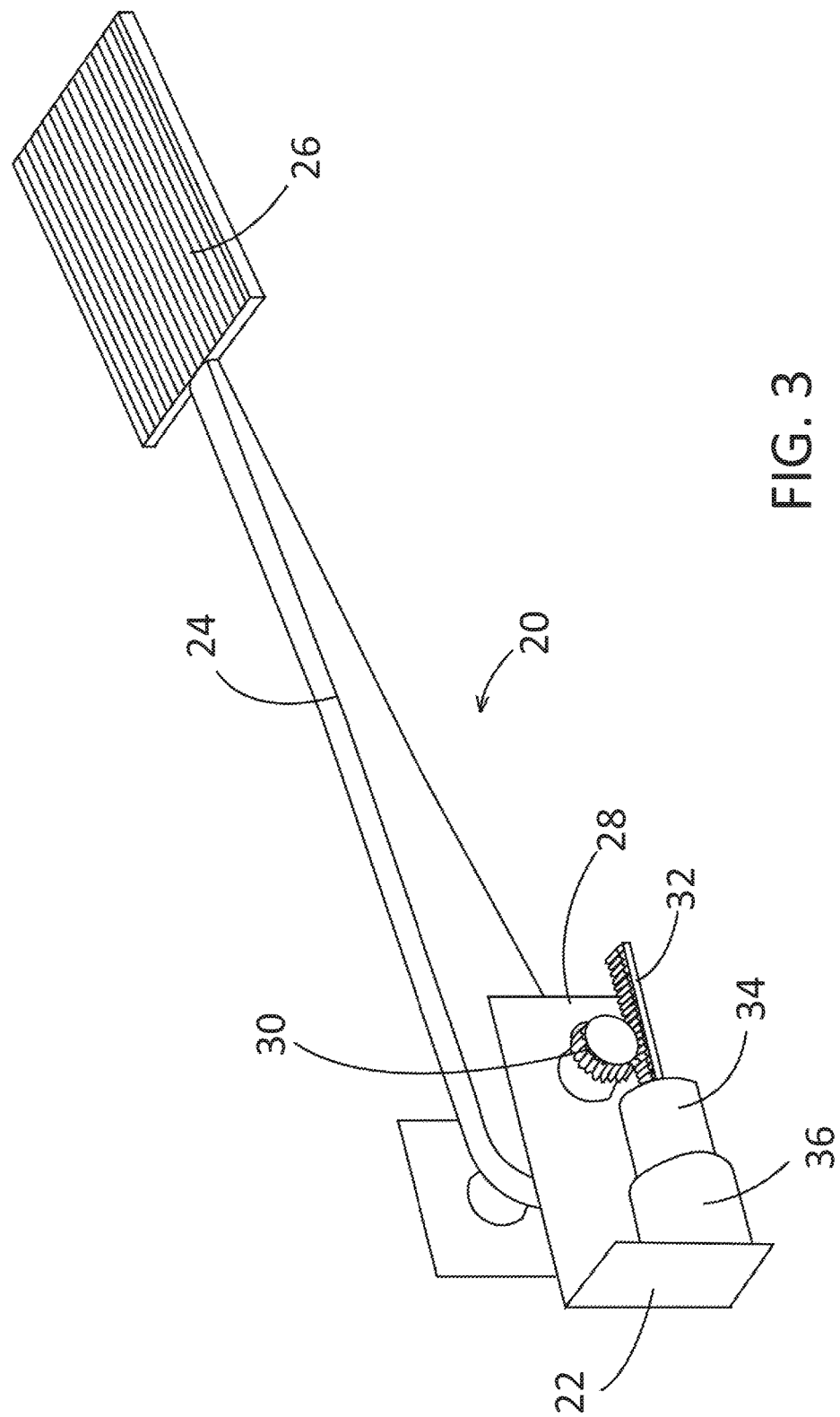
FIG. 3 is a perspective view of an accelerator pedal assembly according to the disclosed inventive concept.
Figure 4:
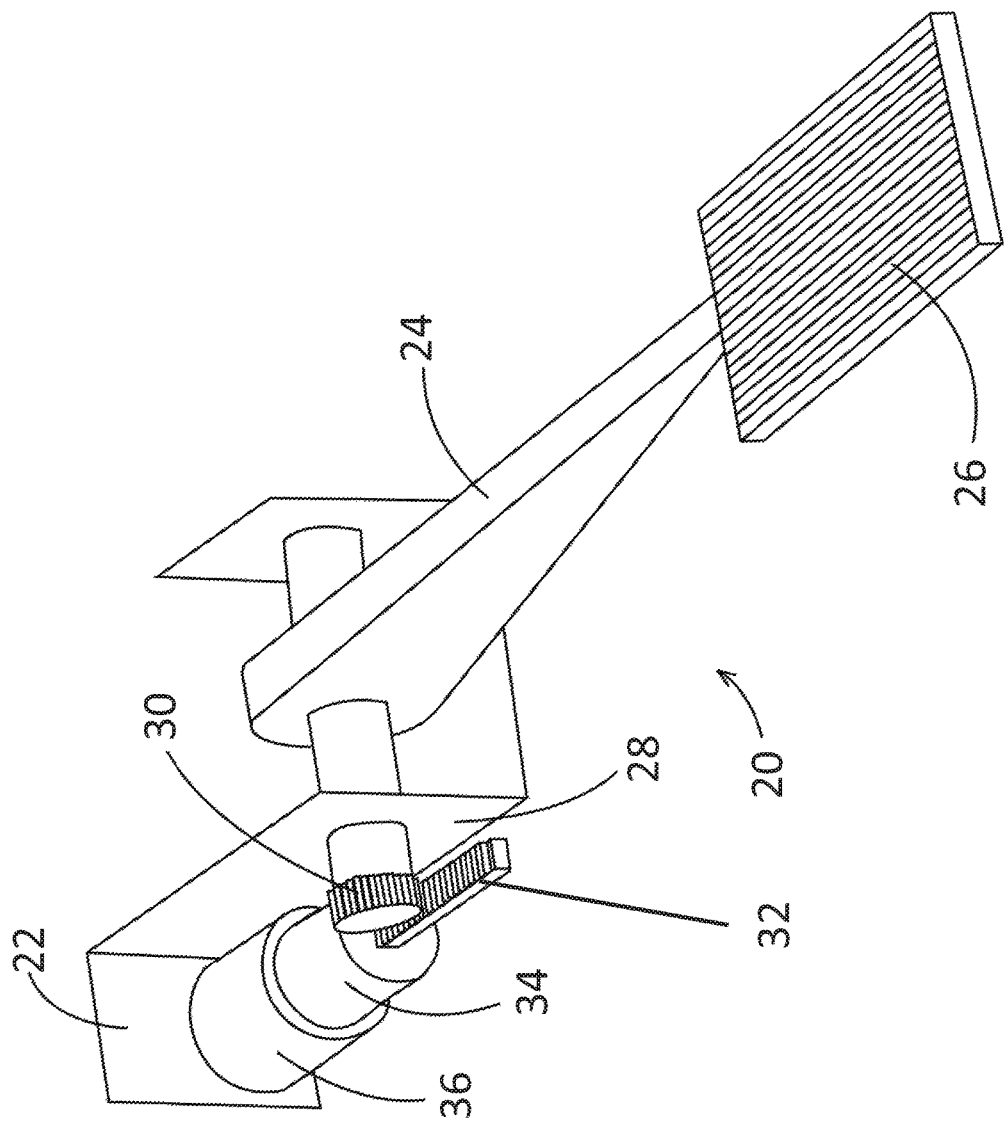
FIG. 4 is another perspective view of the accelerator pedal assembly according to FIG. 3.

Referring to FIGS. 3 and 4, perspective images of a liquid nanofoam accelerator pedal assembly according to the disclosed inventive concept are illustrated. The liquid nanofoam accelerator pedal assembly, generally illustrated as 20, includes an assembly attachment base 22 that is generally attached in the area of the driver's footwell of the vehicle. The attachment point can be on the floor or in association with the instrument panel. The assembly attachment base 22 is provided for illustrative purposes only and is not intended as being limiting as the liquid nanofoam accelerator pedal assembly 20 may be fitted at any point to provide for functional use of the associated pedal.

The liquid nanofoam accelerator pedal assembly 20 includes a pedal arm 24 movably attached to the assembly attachment base 22. The pedal arm 24 includes a foot pedal 26 at one end. A liquid nanofoam drive assembly 28 is incorporated with the liquid nanofoam accelerator pedal assembly 20. The liquid nanofoam drive assembly 28 is operatively associated with the pedal arm 24. The illustrated arrangement of operative attachment includes a rotary drive gear 30 that is attached by a rotary shaft to the pedal arm 24.

The rotary drive gear 30 includes an array of drive teeth that operatively engage the drive teeth provided on an elongated rack 32. In combination, the rotary drive gear 30 and the elongated rack 32 define a rack-and-pinion mechanism. One end of the elongated rack 32 is fixed to a reciprocating piston 34. The reciprocating piston 34 is the movable drive component of a liquid nanofoam-filled cylinder 36 that is fixed to the assembly attachment base 22. As illustrated, the drive teeth of the rotary drive gear 30 mesh with the drive teeth of the elongated rack 32.

Figure 5:
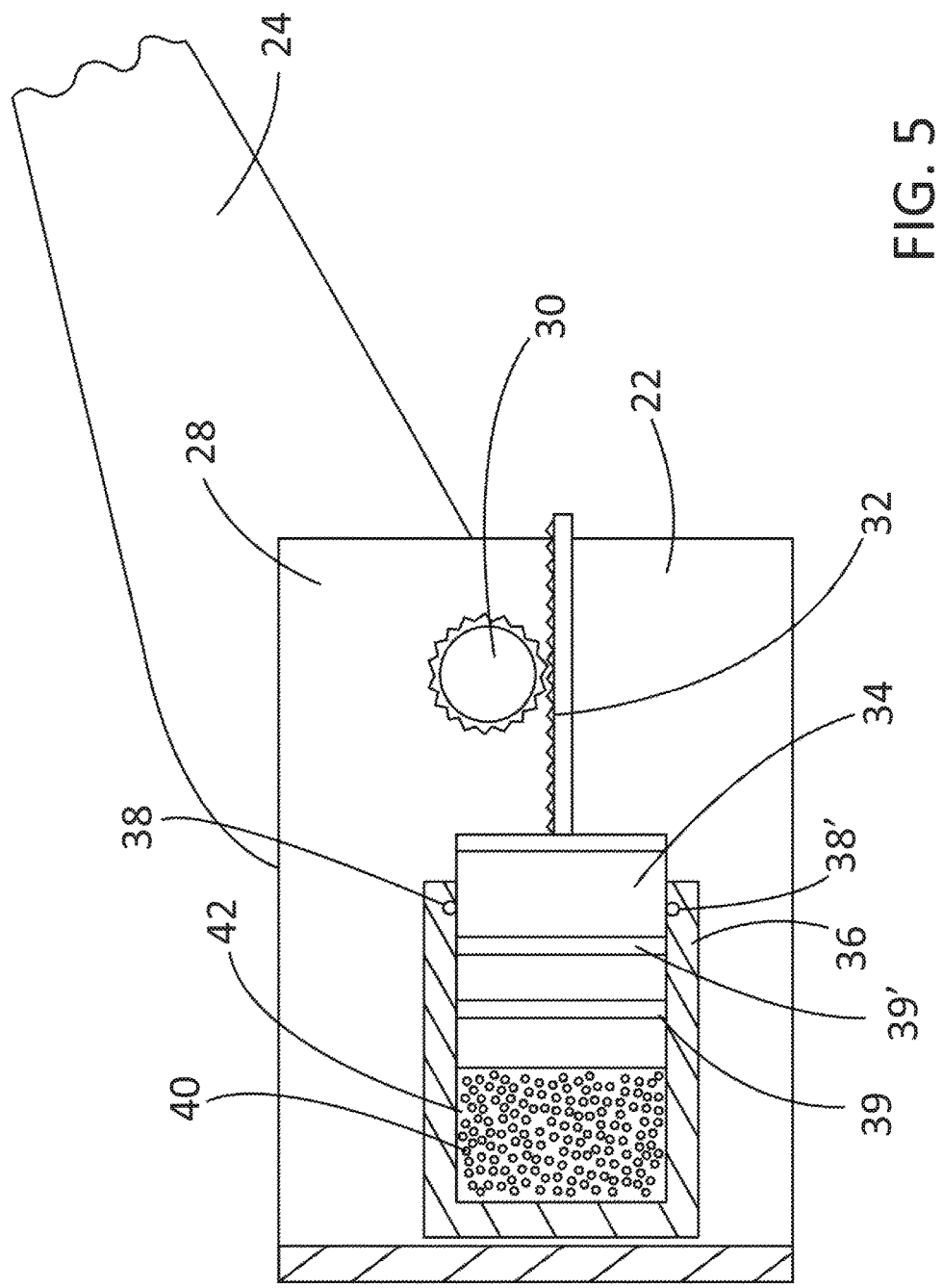
FIG. 5 is a detailed view shown in partial section of the gear, rack, and piston arrangement of the accelerator pedal assembly of the disclosed inventive concept shown in conjunction with the liquid nanofoam-filled cylinder.

A sectional view of the liquid nanofoam drive assembly 28 is illustrated in FIG. 5. With reference thereto, the liquid nanofoam drive assembly 28 includes elements for providing a sealing relationship between the reciprocating piston 34 and the inner surface of the liquid nanofoam-filled cylinder 36. The sealing elements may be either or both a set of O-rings 38 and 38' or a set of piston rings 39 and 39'.

A predetermined volume of hydrophobic nanoporous material 40 is suspended in a liquid carrier 42. The hydrophobic nanoporous material 40 include spheres having nanopores formed in their outer surfaces. Under ambient pressure, the individual spheres are effectively void of the liquid due to the excessive solid-liquid interfacial tension. However, when pressure is applied by the driver's foot against the foot pedal 26, this pressure is translated to movement of the reciprocating piston 34 into the liquid nanofoam-filled cylinder 36. Under a predetermined pressure level, the surface tension is overcome and the surrounding fluid is forced into the individual spheres. Movement of the reciprocating piston 34 into the liquid nanofoam-filled chamber 36 thus continues, causing the vehicle's engine throttle control to accelerate the movement of the vehicle.

When the driver's foot is removed from the foot pedal 26, the pressure on the reciprocating piston 34 is released and the liquid moves out of the spheres forming the hydrophobic nanoporous material 40 force the reciprocating piston 34 and consequently the foot pedal 26 to their original idle positions.

Figure 6:
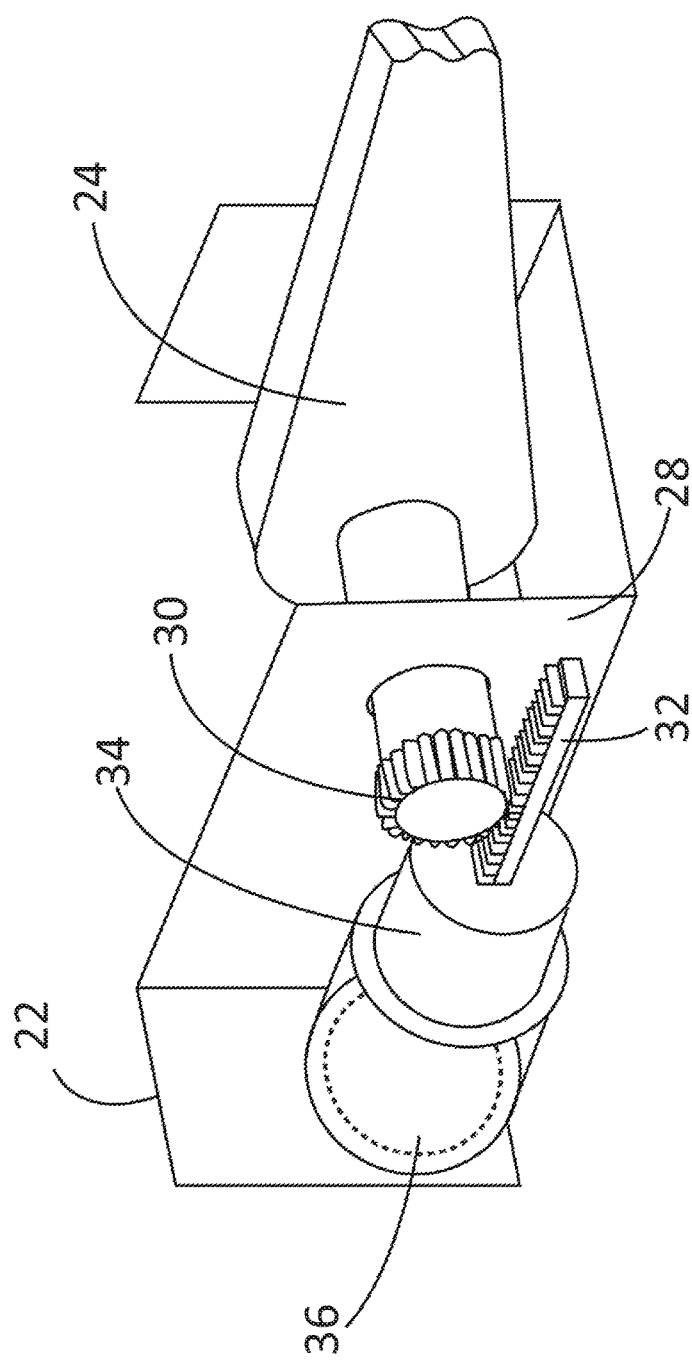
FIG. 6 is another detailed view of the gear, rack, and piston arrangement of the accelerator pedal assembly of the disclosed inventive concept shown in conjunction with the liquid nanofoam-filled cylinder where the pedal arm is in a neutral position.
Figure 7:
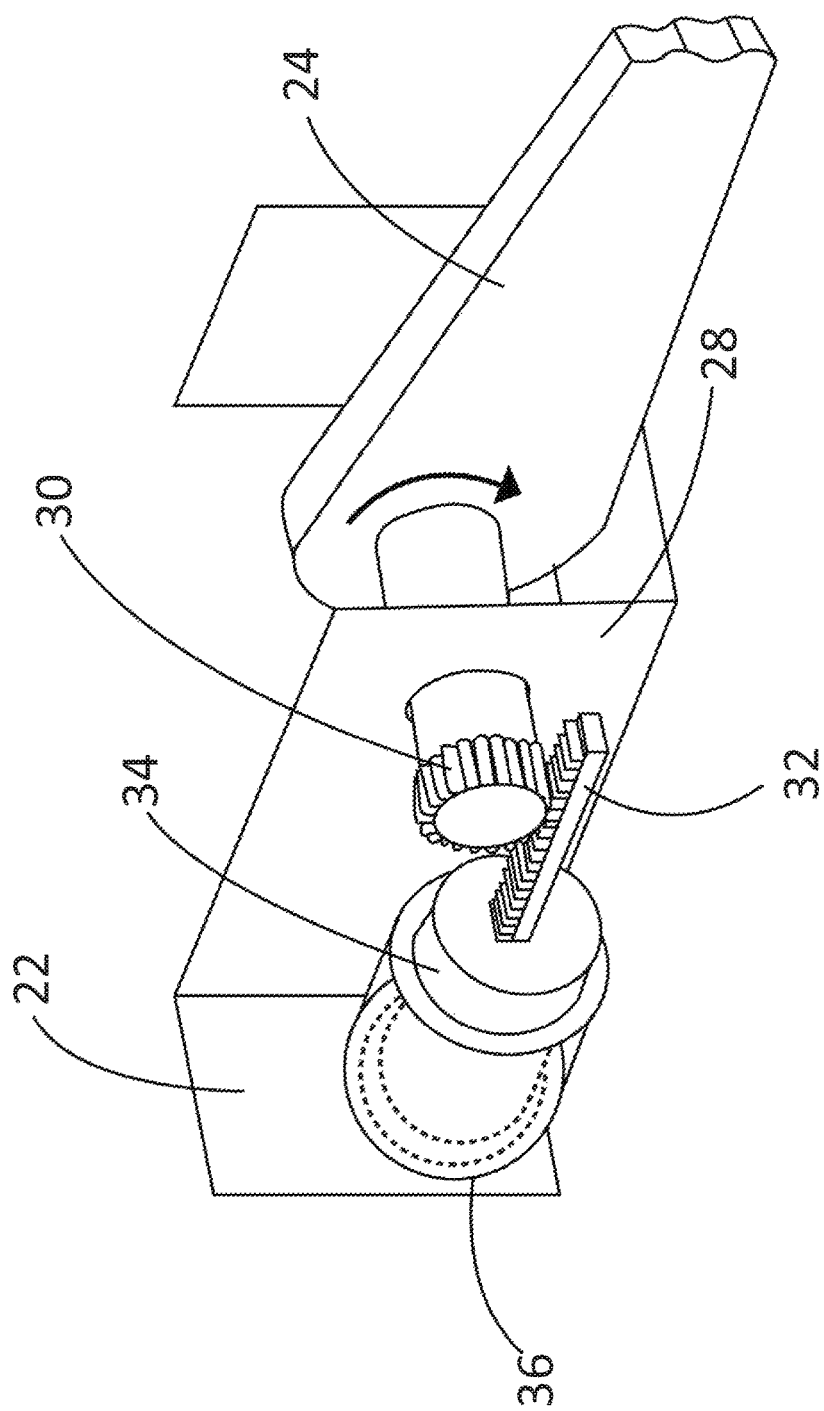
FIG. 7 is a view similar to that of FIG. 6 but illustrating the cylinder where the pedal arm is in an accelerating position.

FIGS. 6 and 7 illustrate the liquid nanofoam drive assembly 28 in its idle position and in its accelerating position respectively. Referring to FIG. 6, the pedal arm 24 is shown rotated to its neutral or idle position. In this position, the reciprocating piston 34 is at the bottom of its range relative to the liquid nanofoam-filled cylinder 36.

Upon acceleration, the pedal arm 24 is rotated thus causing the rotary drive gear 30 to rotate thereby creating linear movement in the elongated rack 32 to thereby drive the reciprocating piston 34 into the liquid nanofoam-filled cylinder 36 as illustrated in FIG. 7. In this position, some of the liquid carrier 42 is forced into the voids of the spheres of the hydrophobic nanoporous material 40 as discussed above.

Figure 8:
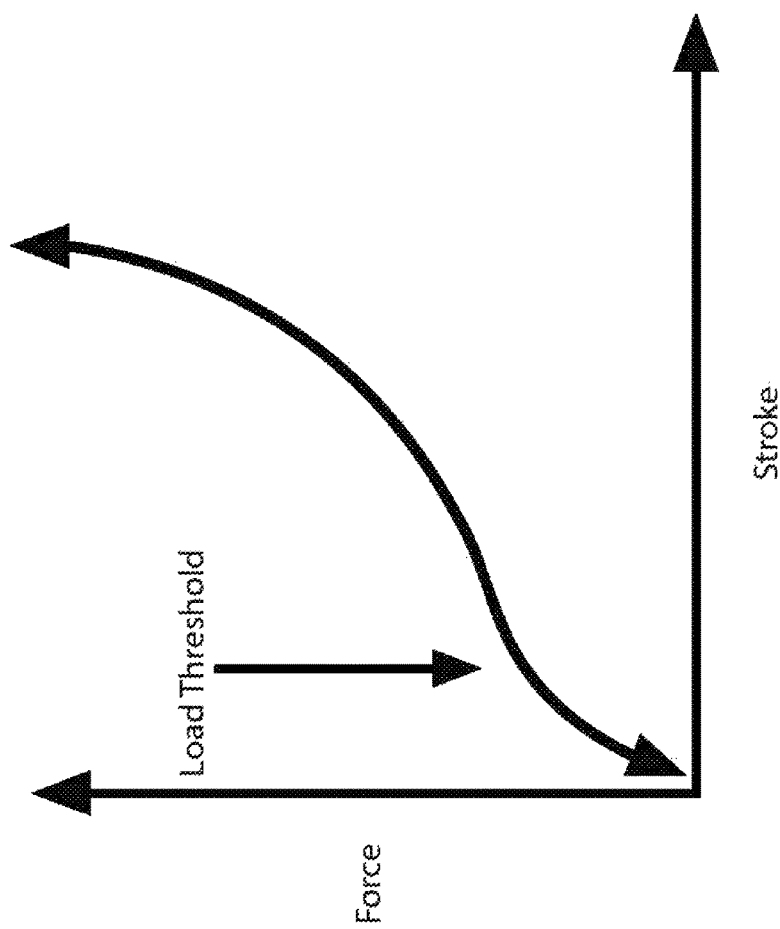
FIG. 8 is a force-stroke response curve illustrating force along the y-axis and stroke along the x-axis.

FIG. 8 graphically illustrates the force-stroke response curve generated by operation of the liquid nanofoam accelerator pedal assembly 20. Force is illustrated on the Y-axis and stroke on the X-axis. The graph demonstrates the load limiting force that is exhibited due to the direct compression of the liquid nanofoam due to the stroke of the reciprocating piston 34 as driven by the linear movement of the elongated rack 32. As illustrated, the load-response of the liquid nanofoam accelerator pedal assembly 20 is reversible while demonstrating no dissipation.

One skilled in the art will readily recognize from such discussion, and from the accompanying drawings and claims that various changes, modifications and variations can be made therein without departing from the true spirit and fair scope of the invention as defined by the following claims.

What is claimed is:

1. An accelerator pedal assembly for use in a vehicle, the assembly comprising:
    an accelerator movably attached to the vehicle;
    a compression assembly including a compression chamber, a piston at least partially fitted within said chamber, a liquid nanofoam within said chamber; and
    a geared driver assembly comprising a rack extending from said piston and a pinion gear engaged with said rack, said geared driver assembly connecting said compression assembly with said accelerator.

2. The accelerator pedal assembly of claim 1, wherein said liquid nanofoam comprises a liquid having a suspension of nanoporous material.

3. The accelerator pedal assembly of claim 1, wherein said accelerator includes a pedal and a pedal arm, said pedal arm having a first axis.

4. The accelerator pedal assembly of claim 3, further including a rotary shaft extending from said pedal arm, said rotary shaft being perpendicular to said first axis of said pedal arm.

5. The accelerator pedal assembly of claim 4, wherein said pinion gear is attached to said rotary shaft.

6. The accelerator pedal assembly of claim 1, further including a fluid seal between said piston and said chamber.

7. The accelerator pedal assembly of claim 1, wherein a seal is formed between said piston and said chamber, said seal being selected from the group consisting of an O-ring and a piston ring.

8. An accelerator pedal assembly for use in a vehicle, the assembly comprising:
    an accelerator movably attached to the vehicle;
    a compression assembly including a compression chamber having a movable surface, said chamber having an interior volume that is changed by the position of said movable surface, said chamber enclosing a nanoporous material and a liquid; and
    a drive assembly comprising a rack extending from said moveable surface and a pinion gear engaged with said rack, said drive assembly connecting said movable surface and said accelerator.

9. The accelerator pedal assembly of claim 8, wherein said nanoporous material and said liquid define a liquid nanofoam.

10. The accelerator pedal assembly of claim 8, further including a piston having a compression end, said compression end defining said movable surface.

11. The accelerator pedal assembly of claim 10, wherein said accelerator includes a pedal and a pedal arm, said pedal arm having a first axis.

12. The accelerator pedal assembly of claim 11, further including a rotary shaft extending from said pedal arm, said rotary shaft being perpendicular to said first axis of said pedal arm.

13. The accelerator pedal assembly of claim 12, wherein said pinion gear is attached to said rotary shaft.

14. The accelerator pedal assembly of claim 10, further including a fluid seal between said piston and said chamber.

15. The accelerator pedal assembly of claim 14, wherein said seal is selected from the group consisting of an O-ring and a piston ring.

16. A method of generating a reversible force-stroke response curve in a vehicle accelerator, the response curve demonstrating no dissipation between acceleration and deceleration, the method comprising:
    forming an accelerator pedal assembly comprising an accelerator pedal movable between a neutral position and an accelerating position, a compression assembly including a compression chamber, a piston at least partially fitted within said chamber, a liquid nanofoam having a suspension of nanoporous material, within said chamber, and a geared driver assembly connecting said compression assembly with said accelerator pedal, said geared driver assembly comprising a rack extending from said piston and a pinion gear engaged with said rack;
    applying pressure on said accelerator pedal to move it from said neutral position to said accelerating position thereby moving said piston into said chamber and causing the force level to rise until reaching a threshold pressure; and
    removing said pressure from said accelerator pedal allowing said piston to be pushed out of said chamber by internal pressure generated by said liquid nanofoam thereby returning said accelerator pedal to said neutral position.

17. The method of claim 16, wherein said threshold pressure is between 0.5 Mpa and 50 Mpa.

* * * * *